United States Patent van Bonn et al.

[11] Patent Number: 5,292,466
[45] Date of Patent: Mar. 8, 1994

[54] PROCESS FOR THE PRODUCTION OF BARRIER LAYERS FOR ADMIXTURES OF POLAR AND NON-POLAR MATERIALS ON THE INNER SURFACE OF HOLLOW MOLDED PARTS MADE OF THERMOPLASTICS

[75] Inventors: Rolf van Bonn, Duisburg; Manfred Eschwey, Dusseldorf, Fed. Rep. of Germany

[73] Assignee: Messer Griesheim GmbH, Frankfurt, Fed. Rep. of Germany

[21] Appl. No.: 48,146

[22] Filed: Apr. 15, 1993

[30] Foreign Application Priority Data

Apr. 18, 1992 [DE] Fed. Rep. of Germany ....... 4212969

[51] Int. Cl.$^5$ .............................................. B29C 49/46
[52] U.S. Cl. ........................................ 264/83; 264/528; 264/529
[58] Field of Search .................. 264/83, 28, 526, 528, 264/529, 523

[56] References Cited

U.S. PATENT DOCUMENTS

| | | | |
|---|---|---|---|
| 3,862,284 | 1/1975 | Dixon et al. | 264/83 |
| 4,296,151 | 10/1981 | Boultinghouse | 427/255.1 |
| 4,394,333 | 7/1983 | Fukushima et al. | 264/83 |
| 4,869,859 | 9/1989 | Eschwey et al. | 264/83 |
| 5,244,615 | 9/1993 | Hobbs | 264/83 |

*Primary Examiner*—Catherine Timm
*Attorney, Agent, or Firm*—Connolly & Hutz

[57] ABSTRACT

For purposes of producing barrier layers on the surfaces of thermoplastics, the surfaces are exposed to a treatment gas containing fluorine. The barrier layers are effective against mixtures of polar or non-polar substances such as, for instance, fuels containing methanol. In order to improve the barrier effect, the cooled-off treatment gas is left to act upon the surface, whose temperature at the beginning of exposure is kept between 60° C. and 250° C. [140° F. and 482° F.].

4 Claims, 1 Drawing Sheet

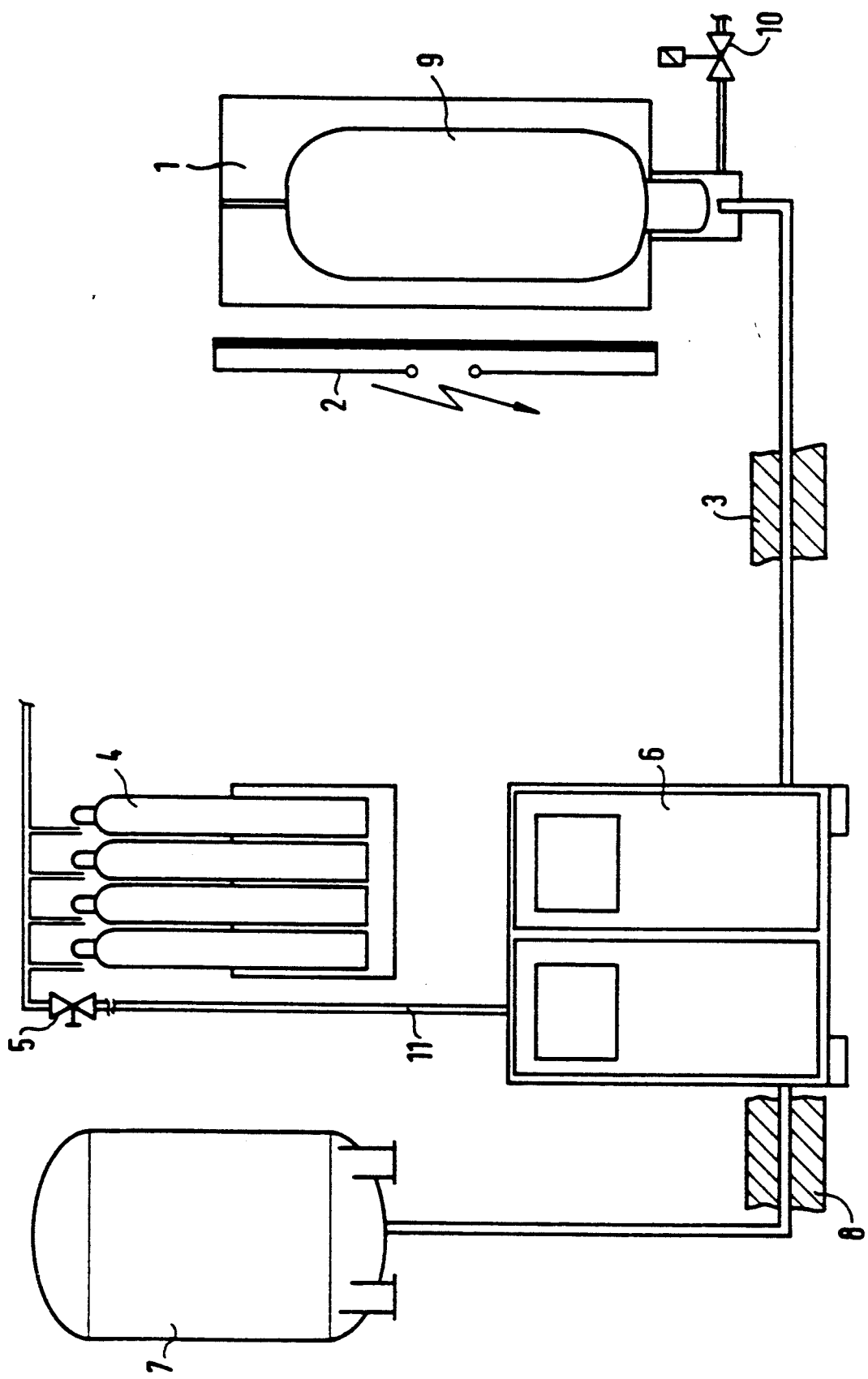

PROCESS FOR THE PRODUCTION OF BARRIER LAYERS FOR ADMIXTURES OF POLAR AND NON-POLAR MATERIALS ON THE INNER SURFACE OF HOLLOW MOLDED PARTS MADE OF THERMOPLASTICS

BACKGROUND OF INVENTION

The technical use of thermoplastics has certain limitations, among other things, in terms of the material properties of the plastics. Probably, the most significant of these limitations is the restricted barrier effect that these plastics offer against gases, vapors and solvents. One possibility to somewhat improve or else overcome this limitation is gas-phase fluorination. With gas-phase fluorination, a polar barrier layer is formed on polyethylene or other polyolefins by means of brief exposure to a treatment gas containing fluorine. Such a process is described, for example, in German patent DE-PS 35 11 743. As a result of such treatment, the usefulness of these mass-produced plastics is considerably enhanced. Nevertheless, the processes for creating barrier layers known so far such as, for instance, co-extrusion, incorporation of barrier layer resins and coatings, are effective only against specific permeating substances, that is to say, certain contents.

As a rule, such barrier layers fail to a greater or lesser extent when they come into contact with mixtures of non-polar or strongly polar substances. The reason for this not yet fully understood phenomenon probably has to do with the swelling behavior of these barrier layer plastics with respect to such solvents. The polar fractions of the permeating substances cause a swelling of polar barrier layers which, in turn, also become more permeable to non-polar components. Naturally, the same applies to polar barrier layers which are covered on the medium side by a non-polar layer, for instance, as is the case with co-extrusion. In this context, first the non-polar outer layers are swollen by non-polar solvents, as a result of which they also become permeable to polar components. As a result of this "entrainment", polar solvents reach the area of the covered polar barrier layer and lead to a pronounced reduction of the barrier effect there, too.

Technical preparations usually consist of such complex admixtures of polar and non-polar substances. These are primarily products of the chemical and petrochemical industries such as, for example, fuels.

The invention is based on the objective of creating a process for the production of barrier layers on the inner surfaces of hollow molded parts made of thermoplastics, which are effective with respect to admixtures of polar and non-polar substances.

The invention is characterized by having the temperature of the surface at the beginning of exposure lie in the range of 60° C. to 250° C. [140° F. to 482° F.]. The reaction energy released during fluorination is removed by cooling the treatment gas.

In the preferred practice of the invention the treatment gas containing fluorine enters the hollow molded part at a temperature between 0° C. and −196° C. [32° F. and −320.8° F.]. The treatment gas is cooled by mixing it with low-temperature nitrogen which had been previously introduced into the molded part.

THE DRAWING

The single FIGURE schematically illustrates an embodiment of the invention with reference to a process chart.

DETAILED DESCRIPTION

As a result of the procedure according to the invention of carrying out the gas-phase fluorination at temperatures below the ambient temperature, preferably between −20° C. and −196° C. [−4° F. and −320.8° F.], it is surprisingly possible to obtain barrier layers on plastic surfaces which are extremely effective with admixtures of polar and non-polar substances. A typical example of such admixtures are modern types of gasoline which, in addition to non-polar hydrocarbons (aliphates, aromatic compounds), also contain components containing oxygen such as alcohols (for instance, methanol, ethanol, methyl tertiary butyl ether, etc.). Moreover, such fuels can also contain varying amounts of water which, in addition to its property as a strongly polar solvent, also intensifies the negative effects of other polar substances on the barrier-layer properties of barrier plastics.

In order to produce barrier layers according to the invention which display a strong barrier effect with respect to the permeating substances mentioned above, the treatment with the gas mixture containing fluorine is carried out at low temperatures of the gaseous medium. For example, the treatment gas containing fluorine can be cooled off to the desired operating temperature in a heat exchanger. This operating temperature should be markedly below the ambient temperature, preferably between −20° C. and −196° C. [−4° F. and −320.8° F.]. The range between −20° C. and −100° C. [−4° F. and −148° F.] generally constitutes an economically ideal spectrum. The temperature of −196° C. [−320.8° F.] is only cited as the lower limit value because this is the boiling temperature of liquid nitrogen, which is the preferred coolant. However, temperatures above −20° C. [−4° F.] up to just below room temperature are already effective according to the invention.

The process according to the invention can be also carried out in two stages. In this context, the temperature in the treatment chamber can be lowered by means of low-temperature nitrogen, or optionally liquefied nitrogen, to such an extent that, after the dosing of the actual treatment gas, the result is a combined temperature which functions as the effective operating temperature according to the invention. In this context, the temperature of the polymer surface only drops negligibly. The objective of all of these measures is to ensure that the treatment gas is colder than the polymer surface with which it is supposed to react. The treatment times lie in the range from a few seconds to a few minutes. An extension of the contact time is not critical and this does not entail any limitation in terms of the invention. The composition of the treatment gas corresponds to the gas mixtures currently employed in gas-phase fluorination, such as, for instance, nitrogen with 0.1% to 10% by volume of fluorine or, in addition to fluorine and nitrogen, also 0.1% to 25% by volume of oxygen.

An especially advantageous embodiment of the process is the integration of the treatment steps according to the invention into the manufacturing process, for example, in the blow-extrusion of hollow molded parts. In this process, the result is not only an improvement of the barrier layer properties with respect to mixtures of polar and non-polar components, but in addition, a reduction of the cycle time of the manufacturing process per molded part is achieved by cooling the inner wall of the container.

The flow chart illustrated in the drawing shows the production of bottles made of HDPE (Hostalen GM 7746 black, made by Hoechst AG) having a density of 0.9444 to 0.948 g/cm$^{-3}$ and a geometrical volume of 500 ml. The bottles 9 are manufactured in the support mold 1 which is heated by means of a heating unit 2. In this process, the bottles 9 are first brought to a uniform wall temperature ranging from 150° C. to 80° C. [302° F. to 176° F] at an internal pressure of 10 bar. Subsequently, the pressure is reduced to approximately 2 bar and the treatment gas containing fluorine is fed into the bottle through the vacuum-insulated line 3. The treatment gas containing fluorine leaves the gas bottles 4 and the line 11 equipped with a shut-off valve 5 and enters the heat exchanger 6. Here, it is cooled to a temperature between −20° C. and −196° C. [−4° F. and −320.8° F.] by means of liquid nitrogen. The liquid nitrogen leaves the storage container 7 through the vacuum-insulated line 8 and likewise enters the heat exchanger 6.

The treatment gas containing fluorine which flows into the bottle 9 can be present in the form of gas or else as a gas-liquid mixture, depending on the operating temperature selected. After completion of the treatment, the treatment gas is removed via valve 10.

Bottles manufactured according to the invention were subjected to a permeation test based on ECE-R 34 with methanol test fuels and/or test fuels containing water, and then compared to conventionally fluorinated containers. The results are compiled in Tables 1 to 3:

TABLE 1

Treatment conditions: pressure: 10 bar; F$_2$ concentration: 1%; surface temperature: 120° C. [248° F.]; contact time: 40 seconds.

| Mass loss of the bottles in percent by weight/d at a temperature of the treatment gas of: | Room temperature | 0° C. [32° F.] | −20° C. [−4° F.] | −100° C. [−148° F.] | −196° C. [−320.8° F.] |
| --- | --- | --- | --- | --- | --- |
| Test fuel (TF)* | 0.005 | 0.005 | 0.005 | 0.005 | 0.005 |
| TF + 1% methanol | 0.2 | 0.15 | 0.1 | 0.01 | 0.008 |
| TF + 3% methanol | 0.3 | 0.18 | 0.12 | 0.01 | 0.009 |
| TF + 15% methanol | 0.25 | 0.15 | 0.1 | 0.01 | 0.008 |
| Super with 1% methanol | 0.1 | 0.08 | 0.08 | 0.007 | 0.006 |
| TF with approx. 0.1% water | 0.15 | 0.1 | 0.1 | 0.007 | 0.006 |
| Control sample (untreated) | 0.6 | — | — | — | — |

*CEC-RF 05; contents: 475 ml

TABLE 2

Treatment conditions: pressure: 10 bar; F$_2$ concentration 0.4%; O$_2$ concentration: 2.6%; surface temperature of the bottle: 140° C. [284° F.]; contact time: 40 seconds.

| Mass loss of the bottles in percent by weight/d at a temperature of the treatment gas of: | Room temperature | 0° C. [32° F.] | −20° C. [−4° F.] | −100° C. [−148° F.] | −196° C. [−320.8° F.] |
| --- | --- | --- | --- | --- | --- |
| Test fuel (TF)* | 0.002 | 0.002 | 0.002 | 0.00 | — |
| TF + 1% methanol | 0.3 | 0.15 | 0.12 | 0.01 | — |
| TF + 3% methanol | 0.38 | 0.18 | 0.15 | 0.01 | — |
| TF + 15% methanol | 0.28 | 0.15 | 0.11 | 0.01 | — |
| Super with 1% methanol | 0.1 | 0.09 | 0.08 | 0.006 | — |
| TF with approx. 0.1% water | 0.15 | 0.1 | 0.1 | 0.007 | — |
| Control sample (untreated) | 0.6 | — | — | — | — |

*CEC-RF 05; contents: 475 ml

TABLE 3

Treatment condtions: pre-cooling of the bottle by means of N$_2$; temperature: −100° C. [−148° F.]; contact time: 40 seconds at 2 bar; F$_2$ concentration: 1%; surface temperature: 120° C. [248° F.]; contact time: 40 seconds.

| Mass loss of the bottles in percent by weight/d at a temperature of the treatment gas of: | Room temperature | 0° C. [32° F.] | −20° C. [−4° F.] | −100° C. [−148° F.] | −196° C. [−320.8° F.] |
| --- | --- | --- | --- | --- | --- |
| Test fuel (TF)* | 0.002 | 0.002 | 0.002 | 0.002 | — |
| TF + 1% methanol | 0.3 | 0.15 | 0.12 | 0.01 | — |
| TF + 3% methanol | 0.38 | 0.18 | 0.15 | 0.01 | — |
| TF + 15% methanol | 0.28 | 0.15 | 0.11 | 0.01 | — |
| Super with 1% methanol | 0.1 | 0.1 | 0.08 | 0.006 | — |
| TF with approx. 0.1% water | 0.15 | 0.1 | 0.1 | 0.007 | — |
| Control sample (untreated) | 0.6 | — | — | — | — |

*CEC-RF 05; contents: 475 ml

The effectiveness of the process according to the inventnion in terms of an improvement of the barrier effect with respect to admixtures of polar and non-polar substances can be directly seen here.

What is claimed is:

1. In a process for the production of barrier layers for admixtures of polar and non-polar substances on the inner surface of hollow molded parts made of thermoplastics, which are blown in a supporting mold and then exposed for some time to a treatment gas containing fluorine, the improvement being in that the temperature of the surface at the beginning of exposure lies between 60° C. and 250° C. [140° F. and 482° F.], and the reaction energy released during fluorination being removed by cooling the treatment gas.

2. Process according to claim 1, characterized in that the treatment gas containing fluorine enters the hollow molded part at a temperature between 0° C. and −196° C. [32° F. and −320.8° F].

3. Process according to claim 1, characterized in that the treatment gas is cooled by mixing it with low-temperature nitrogen which had been previously introduced into the molded part.

4. Process according to claim 3, characterized in that the treatment gas containing fluorine enters the hollow molded part at a temperature between 0° C. and −196° C. [32° F. and −320.8° F].

* * * * *